United States Patent [19]

Babanin et al.

[11] 4,208,250

[45] Jun. 17, 1980

[54] METHOD OF HEATING MULTI-FRACTIONAL MATERIALS AND APPARATUS FOR IMPLEMENTATION

[76] Inventors: Boris I. Babanin, ulitsa Samoletnaya, 9, korpus 2, kv. 30; Vladimir D. Glyanchenko, ulitsa Belinskogo, 167, kv. 79, both of Sverdlovsk; Grigory M. Grechanichenko, Pushkinsky viezd, 7, kv. 16, Kharkov; Leonid I. Erkin, ulitsa Malysheva, 70, kv. 36, Sverdlovsk; Evgeny M. Litvin, Pushkinsky viezd, 7, kv. 5; Daniil D. Matskevich, ulitsa Kolomenskaya, 7, kv. 2, both of Kharkov; Petr Y. Nefedov, ulitsa Titova, 18, kv. 7, Sverdlovsk; Oleg N. Pankratiev, ulitsa Ivanova, 12/16, kv. 61, Kharkov; Evgeny V. Dobrovolsky, Pushkinsky viezd, 7, kv. 8, Kharkov; Anatoly S. Petrukhno, ploschad Rozy Ljuxemburg, 5, kv. 26, Kharkov; Vladlen M. Frumkin, ulitsa Anri Barbjusa, 6, kv. 29, Kharkov, all of U.S.S.R.

[21] Appl. No.: 661,445

[22] Filed: Feb. 25, 1976

Related U.S. Application Data

[63] Continuation of Ser. No. 444,522, Feb. 21, 1974, abandoned.

[51] Int. Cl.² ............................................. C10B 49/00
[52] U.S. Cl. ........................................ 201/10; 201/21; 201/31; 202/108; 202/116
[58] Field of Search ..................... 201/10–12, 201/20–22, 24, 27, 31, 32, 33, 36–38, 44; 202/108, 113, 116, 120, 121, 124

[56] References Cited

U.S. PATENT DOCUMENTS

| | | | |
|---|---|---|---|
| 2,623,011 | 12/1952 | Wells | 201/31 |
| 2,964,464 | 12/1960 | Smith | 201/44 |
| 3,337,417 | 8/1967 | Albright | 201/31 |
| 3,436,314 | 4/1969 | Leonor | 201/31 |
| 3,565,766 | 2/1971 | Eddinger | 201/31 |
| 3,565,827 | 2/1971 | Friday | 201/31 |

Primary Examiner—Norman Yudkoff
Attorney, Agent, or Firm—Holman & Stern

[57] ABSTRACT

A method of heating multi-fractional materials is disclosed wherein additional streams of heat carrier gas of a comparatively high temperature are introduced in a stream of heat carrier which has a maximum-temperature heating zone and a comparatively low-temperature heating zone provided in the process flow. The additional streams are supplied only to the comparatively low-temperature heating zone in the main stream of heat carrier, thereby raising the temperature of the heat carrier stream. Multi-fractional materials are heated as they enter the comparatively low-temperature heating zone in the heat carrier stream and before they have entered the maximum-temperature zone.

The apparatus for implementing the method of heating consists of a plurality of heaters connected in a series relationship and having inlet tubes for supply of heat carrier and the materials to be heated, a means adapted for separating heated materials from waste heat carrier, and discharge tubes for the above products.

The apparatus is also provided with means for producing a heat carrier and inlet tubes for heat carrier supply to the heaters. Specific embodiments of the apparatus may have additional means for producing a heat carrier provided for each of the heaters.

7 Claims, 2 Drawing Figures

METHOD OF HEATING MULTI-FRACTIONAL MATERIALS AND APPARATUS FOR IMPLEMENTATION

This is a continuation of application Ser. No. 444,522 filed Feb. 21, 1974 now abandoned.

BACKGROUND OF THE INVENTION

The invention relates to a method of heating multi-fractional materials and an apparatus for implementing the same.

The invention is particularly adapted for use in the production of blast furnace coke briquettes. One critical stage in the production of blast furnace coke from low-caking coal consists in heating coal, which is a multi-fractional material, to a temperature sufficient to cause coal grains to become plastic before briquetting.

There is known in the prior art a method of heating multi-fractional materials, e.g. coal, in a stream of heat carrier gas, in which multi-fractional materials enter in a step-by-step fashion the stream of heat carrier during the process of progressive heating, the stream having a zone of maximum temperature and a plurality of zones of relatively low temperature. Multi-fractional materials are introduced into the stream of heat carrier in such a manner that they are first heat-treated in the zone of relatively low temperature, ending up in the maximum-temperature zone.

An apparatus known in the prior art is also an apparatus for carrying the above method into effect, which includes a means for producing a heat carrier, and heater units having feed tubes for supplying multi-fractional materials and a heat carrier, a means adapted to separate the materials from waste heat carrier, a tube for discharge of heat carrier and tube for discharge of heated materials, both connected to the separating means.

The old method and apparatus for its implementation suffer from the disadvantages of an inefficient distribution of heat during the process in the various temperature zones of the stream, from the inability to control the stream, and the consequent limited efficiency of the apparatus, and from the fact that the materials tend to be heated in a non-uniform manner depending on their particle size.

There is also known in the prior art a method of heating loose multi-fractional materials, in which after passing through each temperature zone of the heat carrier the materials are subjected to isothermal conditions for the purpose of equalizing the temperatures of various fractions thereof.

The method referred to above does not provide the versatility enough to regulate the heat distribution as between the various temperature zones of the stream, nor is it effective to prevent the smaller fractions from becoming overheated in the early stages of contact with the heat carrier as the materials enter the zone of the maximum temperature.

A method of heating coal is also known, in which, in order to regulate the thermal conditions in the zone of maximum heat of the heat carrier, a separate stream of heat carrier is introduced into such zone and subsequently released into the atmosphere.

The above method is performed in an apparatus comprising a means for producing a heat carrier and a plurality of heaters having a feed tube for supplying the materials to be heated and the heat carrier, a means adapted to separate the heated materials from waste heat carrier, a tube for discharge of heat carrier and a tube for discharge of heated materials, both connected to the separating means, the last heating zone having an additional means for producing a heat carrier with a higher temperature than that of the heat carrier provided by the preceding heating zone.

The disadvantages of the above method include release of high-temperature waste heat carrier into the atmosphere, and lack of provision for regulating heat distribution between the heat-treatment zones.

A disadvantage common to all of the above methods, consists in the inability to intensify the heat-treatment of the materials in the early heating zones, and consequently in the time-consuming process.

The apparatus of the prior art suffer from a common disadvantage of an inefficient distribution of heat between the heaters with consequent non-uniform heating of the smaller coal fractions, as well as a limited capacity and low efficiency of the installations.

SUMMARY OF THE INVENTION

It is an object of the present invention to obviate these disadvantages.

It is a further object of the present invention to provide method of heating multi-fractional materials, in which all particles of multi-fractional materials will be heated in a uniform manner irrespective of the particle size.

It is another object of the invention to provide a method of heating multi-fractional materials, which will minimize variations in the terminal temperature of the materials being heated, caused by variations in such conditions as the size of the charge or the granulometric composition of the materials.

It is a still further object of the invention to provide an apparatus for use in heating multi-fractional materials, in which all the particles of multi-fractional materials will be heated in a uniform manner irrespective of the particle size.

It is still another object of the invention to provide an apparatus for use in heating multi-fractional materials, capable of uniform heating large quantities of such materials.

The above objectives are achieved by heating multi-fractional materials in a stream of heat carrier gas, using a method in which a heating zone of maximum temperature and a plurality of zones of comparatively low temperature are established during the process, multi-fractional materials enter first the zones of the comparatively low temperature of the stream in a step-by-step fashion and then the zone of the maximum temperature of the stream, thereby becoming progressively heated to the maximum temperature; also, under the method of the invention a second stream of heat carrier gas having a higher temperature than the temperature of the particular zone is supplied into each of the zones of comparatively low temperature.

The intensive heat-treatment of the materials in the zones of comparatively low temperature provides efficient heating of all particles of multi-fractional materials irrespective of the particle size and of the size of the charge.

Beneficial results are obtained by controlling the temperature of the stream of heat carrier in each of the zones after the second stream of heat carrier has been introduced therein by varying the quantity of heat carrier in the second stream.

An embodiment of the present invention consists in an arrangement in which the temperature of the heat carrier in each zone after the introduction of the second stream of heat carrier is controlled by varying the temperature of the heat carrier in the second stream.

The capability to regulate the temperature of the heat carrier in each zone permits to minimize the temperature gradient as between the materials and the heat carrier supplied into the particular zone, avoids overheating of the smaller fractions of the materials, and reduces variations in the terminal temperature of the materials, caused by variations in such conditions as the size of the charge.

Beneficial results are obtained by heating multifractional materials in an apparatus comprising a means for producing a heat carrier, a plurality of heaters having feed tubes for supplying the materials to be heated and the heat carrier therein a means adapted to separate the materials from waste heat carrier, and a tube for discharge of heat carrier and another one for discharge of heated materials, both connected in parallel relationship to the separating means; each heater according to the invention except for the heater adapted to heat materials to the maximum temperature, being provided with an additional means for producing a heat carrier having a higher temperature than that of the heat carrier suplied by the next-in-line heater, the second means being connected to the tube carrying the materials to be heated and to the heat carrier upstream of the point at which the materials enter said tube.

Beneficial results are further obtained by providing the means for producing a heat carrier with means to control the supply and temperature of the heat carrier.

An embodiment of the present invention consists in an arrangement in which the method of heating multifractional materials is performed in an apparatus comprising a means for producing a heat carrier, a plurality of heater units having a feed tube for supplying the materials to be heated and the heat carrier thereto, a means for separating the materials from a waste heat carrier, a tube for discharge of the heat carrier and a tube for discharge of the heated materials, both connected in a parallel relationship to the separating means, each heater unit according to the present invention, except for the heater adapted for heating the materials to the maximum temperature, being connected to an additional means for producing a heat carrier by a second tube connected to the tube carrying the materials to be heated and the heat carrier upstream of the point at which the materials to be heated enter the tube.

Beneficial results are obtained by providing the second tube with means to control the supply of heat carrier.

The apparatus of the invention permits uniform heating of all fractions of multi-fractional materials irrespective of their particle size, and the output of the apparatus is two to two and a half times as high as that of the prior art apparatus.

The advantages obtained from an apparatus in which each heater with the exception of the last one is provided with an additional means for producing a heat carrier, which is the source of heat, include the capability to control the additional stream of heat by varying the supply of cold and dust-free heat carrier. The stream of heat can further be controlled by varying either the supply or the temperature of the heat carrier produced in the additional means.

Where an additional stream of heat is supplied to the heater via a second tube from the main source of heat any attempt to control the supply of heat presents certain problems as it becomes possible only by varying the supply of a high-temperature dust-contaminated heat carrier.

However, in the case of certain arrangements of heaters, for instance for use in heating coal, supplying a second stream of heat to the heater from the common source may be preferable in terms of the supply required to meet the safety standards.

BRIEF DESCRIPTION OF THE DRAWINGS

The other objects and advantages of the present invention will become more readily apparent from the following detailed description of the method of heating multifractional materials and of the apparatus for implementing the method with reference to the accompanying drawings, in which.

DETAILED DESCRIPTION OF THE PREFERRED EMBODIMENTS

Figure 1:
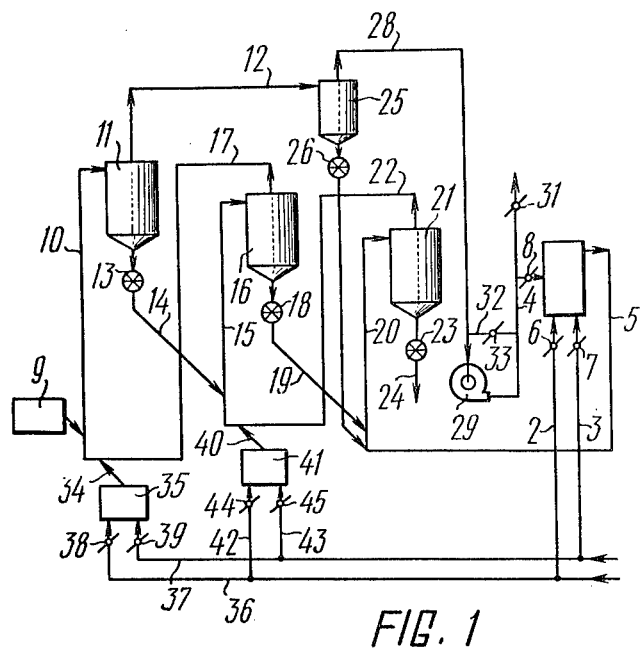
FIG. 1 shows the apparatus according to the invention, adapted for implementing a method of heating multifractional materials and provided with means for supplying added heat to the individual heaters from additional sources of heat provided for each of the heaters.

The apparatus for heating multi-fractional materials according to the present invention comprises a means 1 for producing a heat carrier gas of a specified temperature, which may consist of any one of conventional combinations of burners. The means 1 has, connected thereto, tubes 2, 3 and 4 for supplying fuel gas, air and a diluting waste heat carrier respectively, and a tube 5 for carrying the heat carrier produced in the means 1 into the heater adapted for heating the materials to the maximum temperature. The tubes 2, 3 and 4 are fitted with means 6, 7 and 8, respectively adapted to vary the supply of the gaseous substances, such as gate or turning slide valves.

The apparatus further comprises at least two heater units connected in a parallel relationship.

The first heater comprises a charging means 9, such as an auger having a sealing means and adapted for supplying the materials to be heated from a bin (not shown) into a tube 10 adapted for carrying the materials and heat carrier, to which a means 11 for separating the heated materials from waste heat carrier is connected in series. The means 11 may be fashioned as a cyclone.

A tube 12 for discharge of the heat carrier from the heater and a tube 14 for carrying the materials to be heated into the next heater are connected to the means 11, the latter via a sluice gate 13. The gate 13 is adapted to prevent the heat carrier gas from entering the tube 14 together with the materials discharged from the means 11.

The second heater of the apparatus includes a tube 15 adapted to transfer the heat carrier and the materials (the tube being an extension of the tube 14) and a means 16 for separating heated materials from waste heat carrier in a function similar to that of the means 11 and connected to the tube 15 in a series relationship. A tube 17 which opens into the means 16 adapted to transfer heat carrier from the second heater to the tube 10 of the first heater, and a tube 19 connected to the means via a sluice gate 18 similar to the gate 13 is adapted to transfer heater materials to the next heater.

The third and last heater for heating multi-fractional materials comprises a tube 20 for transfer of heat carrier and the materials to be heated and connected in series relationship thereto, a means 21 adapted for discharge of heater materials from waste heat carrier in a function similar to that of the means 11 and 16. The tube 5 supplying heat carrier from the means 1 and, downstream of the tube 5, the tube 19 carrying the materials to be heated from the preceding heater open into the initial portion of the tube 20.

The means 21 has, connected thereto, a tube 22 for transferring heat carrier into the preceding heater whose opposite end opens into the tube 15, and through the sluice gate 23, a tube 24 for discharge from the apparatus of materials heated to a specified temperature.

The tube 12 for transferring the waste heat carrier leaving the first heater is connected to a means 25 adapted for additionally filtering dust out of the heat carrier, and which may consist of a plurality of cyclones, a multi-cyclone unit or of any other dry dust arresting devices. Dust arrested by the means 25 is recycled into the process via a sluice gate 26 similar to the gates 13, 18 and 24 and a tube 27 adapted for transferring dust and opening into the tube 20 or 19 and is fixed in with the materials being headed in the third heater.

The means 25 also has, connected thereto, a tube 28 for transferring filtered heat carrier gas, which opens into the nozzle of a centrifugal-type blower 29 which circulates the heat carrier and the materials to be heated through the apparatus.

The pressure end of the blower 29 is connected by a tube 30 to the tube 4 having the control means 8 consisting, for instance, of a turning slide valve, and to the means 1 for producing a heat carrier. Mounted on the opposite end of the tube 30, which opens into the atmosphere, is a means 31 of any suitable type adapted to control the discharge of waste heat carrier. A tube 32 having a means 33, e.g. a turning slide valve, adapted to control the supply of heat carrier circulating in the apparatus is provided between the suction and pressure ends of the circulation blower 29 between the tubes 28 and 30, respectively.

In the apparatus of the invention adapted to implement the method of heating multi-fractional materials, in which heat is supplied to each heater according to the invention except the last one from each of the additional sources of heat provided for each of the heaters (FIG. 1), a tube 34 is arranged to open into the tube 10 of the first heater upstream of the point at which the charging means is connected thereto, the opposite end of the tube 34 being connected to an additional means 35 for producing a heat carrier. The means 35 has, connected thereto, a tube 36 for supplying fuel gas and an air supply tube 37 respectively fitted with gas supply control means 38 and 39, which are also suitable for controlling the supply and temperature of the heat carrier entering the means 35. The means 35 may consist of any suitable gas-fired burner.

As in the case of the first heater described above, the second and any other heater except the last one has, connected thereto upstream of the point at which the tube 14 supplying the materials to be heated from the preceding heater to the tube 15 opens thereinto, a tube 40 which opens into an additional means 41 for producing a heat carrier in a function similar to that of the means 35. Opening into the tube 40 are tubes 42 and 43 having control means 44 and 45, respectively. The tubes 42 and 43 and the control means 44 and 45 perform functions similar to those of said tubes 36 and 37 and control means 38 and 39, respectively.

Figure 2:
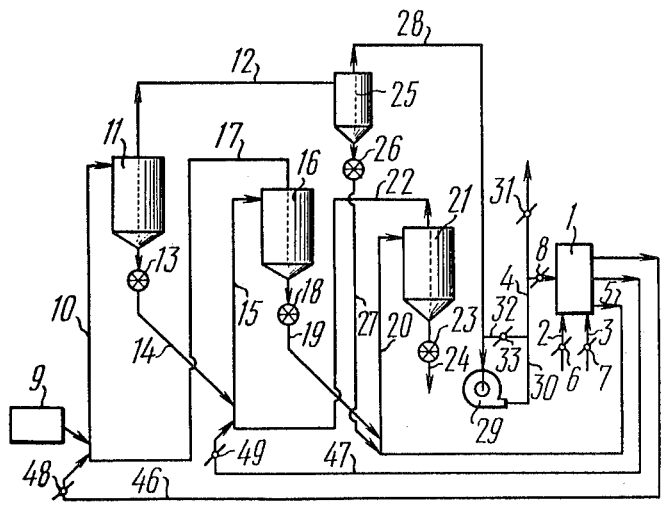
FIG. 2 shows the apparatus adapted for implementing a method of heating multi-fractional materials and provided with means for supplying added heat to the individual heaters from the main source of heat according to the invention.

In heating multi-fractional materials, where additional heat is supplied into each of the heaters with the exception of the last directly from the main source of heat (FIG. 2) the tube 10 of the first heater and the tube 15 of the second heater are connected to the means 1 for producing a heat carrier. The above connection is provided by the tubes 46 and 47 with control means 48 and 49 of a suitable type adapted to control the amount of heat carrier supplied additionally to the particular heater directly from the means 1.

The method of heating multi-fractional materials involving additional heat supplies to the individual heaters directly from additional sources of heat is effected in the following manner (FIG. 1);

The means 1, 35 and 41 for producing a heat carrier are supplied with fuel gas via the tubes 6, 36 and 42, and with air via the tubes 3, 37 and 43. The temperature of the products of combustion of the fuel gas in the means 1 is reduced to the specified level by the addition of waste heat carrier supplied via the tube 4 to form a heat carrier gas which flows via the tube 5 into the tube 20 of the third, i.e. terminal, heater and then into the means 21, the tube 22 and the tube 15 of the second heater.

Heat carrier produced by the combustion of the fuel gas in the means 41 also flows into the tube 15 of the second heater via the tube 40.

Thus, the tube 15 of the second heated receives two streams of heat carrier travelling via the tubes 22 and 40. These two streams are mixed together in the tube 15 to form a single stream which enters the means 16 and then, travelling via the tube 17, the tube 10 of the first heater. The tube 10 further receives, via the tube 34, the heat carrier produced by the fuel gas burnt in the means 35 of the first heater. Thus, the first heater, too, receives two streams of heat carrier. The two streams mingle in the tube 10 to form a single stream which enters the means 11 and then, via the tube 12, the means 25 where it is filtered for dust. Waste heat carrier is directed, via the tube 28 into the circulation blower 29 and then, via the tubes 30 and 4, to the means 1 where it is diluted to lower the temperature of the products formed by the combustion of the fuel gas.

A certain amount of the waste heat carrier together with a suitable amount of the products of the combustion of the fuel gas supplied to the main and additional means for producing a heat carrier is released into the atmosphere through the tube 30 and the control means 31.

From the charging means 9, the materials to be heated are directed into the tube 10 of the first heater, where they are caught up by the stream of heat carrier and mix therewith to form a gas/air mixture. The materials are heated in the tube 10 by collecting heat from the heat carrier. The temperature of the materials can be controlled by varying the amount and temperature of the heat carrier supplied via the tubes 17 and 34.

The materials to be heated are separated from the heat carrier in the means 11 of the first heater and directed via the sluice gate 13 and the tube 14 to the second heater which is the tube 15.

In the tube 15, the materials are again caught up by the heat carrier stream to become heated to a higher temperature than was the case in the first heater, whose specific level depends on the amount and temperature of the heat carrier supplied via the tubes 22 and 40.

The heat distribution as between the third heater on the one hand and the first and second heaters on the other hand may be controlled by varying the amount and temperature of heat carrier supplied via the tubes 34 and 40, which also enables temperature variations of the materials being heated to be levelled off after each and, especially, after the last heater.

From the tube 15, the mixture enters the means 16 of the second heater where the materials separated from the heat carrier are directed, via the sluice gate 18 and the tube 19, into the third heater which is the tube 20. Via the sluice gates 26 and the tube 27, the tube 20 also receives, from the means 25 adapted for filtering dust out of the heat carrier, fine coal breeze carried by the heat carrier out of the means 11.

The gas/air mixture flows from the tube 20 into the means 21 of the third, i.e. terminal heater where the materials are separated from the heat carrier and, heated to the specified temperature, pass through the sluice gate 23 and via the tube 24 for delivery.

The operation can control the temperature of heating in each heater by varying the amount and temperature of the heat carrier supplied by the main means 1 and by the additional means 41 and 35 for producing a heat carrier to the third, second and first heaters, respectively, thereby controlling the distribution of temperature between the heaters for maximum efficiency.

In heating multi-fractional materials by a method in which additional heat is supplied to the individual heaters directly from the main source of heat (FIG. 2), the apparatus operates substantially as described above with the exception that additional heat is supplied to the appropriate heaters as streams of heat carrier flowing via additional tubes directly from the main means 1 for producing a heat carrier, i.e. they bypass the other heaters to avoid a loss of heat by contact with the materials to be heated, as is the case with the main stream of heat carrier.

Thus, heat carrier in amount set by the control means 48 is supplied directly from the means 1 via the tube 46 into the tube 10 of the first heater upstream of the point at which the materials to be heated enter it from the charging means 9. In the same way, heat carrier in an amount set by the control means 49 is supplied directly from the means 1 via the tube 47 into the tube 15 upstream of the point at which the tube 14 opens thereinto.

No additional heat carrier is supplied to the last heater and the supply of heat to this heater is controlled by varying the amount of heat carrier supplied via the tube 5 from the means 1.

The controlling action is provided by control means, e.g. by turning slide valves 33 and 31 for supply and by valve 8 for temperature, disposed in the path of waste heat carrier for a longer service life. This arrangement is more suitable than one adapted to control a stream of high-temperature heat carrier flowing through the tube 5.

The temperature of the materials in each of the heaters may be controlled by varying the amount of heavy carrier supplied via the tubes 46, 47 and 5 to the first, second and third heaters, respectively, thereby redistributing the thermal load between the heaters for maximum efficiency.

The advantage provided by the capability to control the heat supplied by the additional streams of heat carrier gas to the individual heaters include (1) a more intensive heating of the materials in the first heaters and a consequent appreciable increase in the efficiency of the apparatus (2) by redistributing the thermal load between the heaters, the load on the terminal heater is reduced, while by lowering the gradient of temperatures between the materials being heated and the heat carrier supplied to that heater overheating of the smaller fractions of the materials is effectively avoided; and (3) the additional heat carrier streams provide the capability to control the thermal conditions in each individual heater by varying the temperature of the materials at the delivery end of each heater to suit the temperature of the materials at the output of the apparatus as a whole. This feature contributes to the greater simplicity and higher precision in controlling the terminal temperature to which the materials are heated, lowers the gradient as between the initial and terminal temperatures of the materials in the last heaters by consequence of a lower thermal load in that heater, and minimizes the range of variations in the terminal temperatures of the materials at the delivery end of the apparatus according to this invention.

EXAMPLE

A batch of coal having humidity of 10+-2 percent, particle size range of 0-30 mm-90+2 percent, and charged into the apparatus in amounts varying by ±5 percent is heated from +15° C. to 450° C., using a heat carrier gas, in a heating apparatus comprising three heaters or heating zones. Heaters 1 and 2 have additional streams of heat supplementing the main stream and adjusted to provide the following heat carrier temperature levels at the points where coal enters the apparatus: 700° C. in heater No. 1, 600° C. in heater No. 2, and 550° C. in heater No. 3. The thermal load distribution is as follows: heater No. 1 ca. 50%; heater No. 2 ca. 35%; heater No. 3 ca. 15% of the combined heat requirement.

The above thermal load distribution permits uniform heating of all coal fractions irrespective of their particle size. Furthermore, the efficiency of the apparatus is more than twice as high as that of prior installations of comparable size.

Given the same conditions less additional heat supply, the thermal loss distribution has been found to be as follows: heater No. 1 ca. 20%, heater No. 2 ca. 30-5%; heater No. 3 ca. 45-50% of the combined heat requirement.

What we claim is:

1. An apparatus for use in heating multi-fractional materials containing solid particles of different sizes continuously entrained in a recirculated carrier gas, in which a heating zone of maximum temperature and at least one heating zone of comparatively low temperature are established, said apparatus comprising: means for producing a heat carrier gas pressure, at least two heaters, one of which is adapted to heat the materials to a maximum temperature, each heater comprising a supply tube whereby the materials to be heated and the heat carrier are supplied to said heaters; an additional means incorporated in each heater, except the heater adapted to heat the materials to the maximum temperature, and suitable for producing a heat carrier having a higher temperature than that of the heat carrier obtained from the immediately following heater in the process of heating, said additional means being connected to the supply tube carrying the materials to be heated and the heat carrier upstream of the point at which the materials to be heated enter said tube; means for separating heated materials from waste heat carrier and connected to the tube carrying the materials to be heated and the heat carrier downstream of the point at which said materials and heat carrier enter said tube; a tube for discharge of heat carrier and a tube for discharge of heated materials connected in parallel relationship to said separating means, said means for providing said heat carrier gas pressure being connected upstream of said zone of maximum temperature and downstream of the zone of comparative low temperature for recycling the heat carrier gas between said heating zones.

2. An apparatus as claimed in claim 1, in which said additional means for producing heat carrier comprises means for controlling the supply and temperature of the heat carrier produced.

3. An apparatus for use in heating multi-fractional materials containing solid particles of different sizes, in which a heating zone of maximum temperature and at least one heating zone of comparatively low temperature are established, said apparatus comprising: means for producing a heat carrier, at least two heaters, one of which is adapted to heat the materials to a maximum temperature, each heater comprising a tube whereby the materials to be heated and the heat carrier are supplied to said heaters; an additional tube connecting each of said heaters of the apparatus with the exception of the heater adapted for heating the materials to the maximum temperature to said means for producing a heat carrier, said additional tube being connected to said tube carrying the materials to be heated and the heat carrier upstream of the point at which said materials enter the tube; means for separating heated materials from waste heat carrier and connected to said tube carrying the materials to be heated and the heat carrier downstream of the point at which said materials and heat carrier enter the tube; a tube for discharge of heat carrier and a tube for discharge of heated materials connected in parallel relationship to said separating means.

4. An apparatus as claimed in claim 3, in which said additional tube has means for controlling the heat carrier supply.

5. A method of heating a multi-fractional material containing solid particles of different sizes continuously entrained in a stream of a heat carrier gas which passes through all the zones from a zone of maximum heating to a zone of minimum heating of said multi-fractional material, comprising: feeding said multi-fractional material into said stream of heat carrier gas consecutively into each zone from the zone of minimum heating to the zone of maximum heating of said multi-fractional material; transporting said multi-fractional material by said stream of heat carrier gas with the simultaneous transfer of the heat from said heat carrier gas to said material from the place of feeding said material into a given zone to the place of discharging said material from the given zone; separating said material from said heat carrier gas and the discharge of said material from the given heating zone; and feeding into each heating zone, except for the zone of heating said multi-fractional material to the maximum temperature, of an additional stream of the heat carrier gas having a temperature higher than that of said stream of the heat carrier gas passing through all the heating zones before entering the given zone while continuously recycling the carrier gas by means of a single recirculating pump means.

6. The method of heating a multi-fractional material as claimed in claim 5, in which the temperature of the stream of heat carrier in each heating zone except for the zone of heating said material to the maximum temperature after the feeding thereinto of said additional stream of the heat carrier gas is controlled by varying the amount of heat carrier in said additional stream.

7. A method of heating a multi-fractional material as claimed in claim 5, in which the temperature of the stream of heat carrier in each heating zone except for the zone of heating said material to the maximum temperature is controlled by varying the temperature of the heat carrier in said additional stream.

* * * * *